United States Patent
Herring et al.

(10) Patent No.: US 7,236,326 B2
(45) Date of Patent: Jun. 26, 2007

(54) MECHANISM FOR LOCKING OUT IMPROPERLY INSERTED CARTRIDGE

(75) Inventors: Aaron L. Herring, Tucson, AZ (US); Shawn M. Nave, Tucson, AZ (US); Raymond Yardy, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 10/865,689

(22) Filed: Jun. 10, 2004

(65) Prior Publication Data
US 2005/0275965 A1  Dec. 15, 2005

(51) Int. Cl.
*G11B 15/68* (2006.01)
(52) U.S. Cl. ........................................ 360/92
(58) Field of Classification Search ............... 360/92, 360/94
See application file for complete search history.

(56) References Cited

U.S. PATENT DOCUMENTS 6,088,189 A * 7/2000 Utsumi et al. ............... 360/92
6,141,180 A   10/2000 Smith

* cited by examiner

*Primary Examiner*—A. J. Heinz
(74) *Attorney, Agent, or Firm*—Quarles & Brady LLP

(57) ABSTRACT

A hinged flap including an angled surface and a flat surface prevent the incorrect loading of a 3592 data cartridge into a dedicated pass-through slot. The angled surface of the hinged flap is pushed by a recessed angled surface in the front face of the 3592 data cartridge to force the hinged flap out of the slot, allowing the cartridge to be inserted. In the absence of the recessed angled surface in the front face of the data cartridge, the flat surface of the flap blocks insertion of the data cartridge.

20 Claims, 5 Drawing Sheets

MECHANISM FOR LOCKING OUT IMPROPERLY INSERTED CARTRIDGE

BACKGROUND OF THE INVENTION

1. Field of the Invention

This invention relates generally to automated data-storage libraries and, in particular, to a lockout mechanism for ensuring that a data cartridge is inserted correctly into the receiving cell of the input/output station of a library.

2. Description of the Prior Art

The portability of magnetic tape cartridges makes it possible to store them in readily accessible multi-cell libraries, so that large amounts of data can be saved and retrieved at will using automated equipment. When, for example, a particular cartridge is required for use in a computer's tape drive, the unit is retrieved by a robot from the cell where it has been stored in a library and it is automatically loaded for processing.

Cartridges are initially placed into libraries manually through input/output stations which consist of stacks of individual through-slots with an exterior opening adapted to receive a cartridge of a predetermined size and configuration. For example, FIG. 1 illustrates an IBM 3584 Automated Library that incorporates an I/O station 10 with a cartridge 12 inserted half-way into a receiving through-slot 14. Each slot has also an interior opening (not shown) through which the cartridge is removed by a robot for automated placement in a library storage cell or magazine. The picker mechanism through which each cartridge is transferred includes gripper arms that hold the cartridge and guide it in and out of the I/O station, and similarly in and out of the library cell, computer peripheral, or other device being used. The cartridges have retaining features that permit gripper arms to latch on to the cartridge by means of appropriate locating and gripping notches or equivalent structural features built into the case of the cartridge.

In operation, each cartridge 12 is initially inserted manually by an operator into a slot 14 of a receiving cell in the I/O station. The cartridge must be positioned correctly in order for the gripper arms to be able to retrieve it from the other side of the cell. Improper orientation of the cartridge would cause a failure of the automated system. The problem is worse with libraries that operate with multiple types of cartridges.

Two of the cartridge formats most widely used currently around the world are the so called DLT (digital linear tape) and LTO (linear tape open) formats, each are characterized in detail by corresponding ECMA (European Computer Manufacturers Association) 286 and 319 standards. Some additional cartridge formats are the IBM 3592 and the IBM 3590 formats. A mixed-media library, such as IBM's 3584, may utilize cartridges conforming to some or all of these formats and an I/O station must be able to distinguish between the different types of cartridges.

Each cartridge format features prescribed structural attributes adapted to function with conforming standard features in the automated mechanisms of a corresponding drive, picker and library system. For example, a typical DLT format cartridge 20, such as IBM's DLT IV Cartridge illustrated in FIG. 2, is characterized by a hinged door 22 on the front side 14 of the cartridge. When the DLT cartridge is inserted into a drive, a stationary device penetrates a gap 26 in the door hinge 28 and presses against a spring-loaded latch 30 to automatically release the door 22 and swing it open toward the front of the cartridge. As a result, the tape's leader inside the cartridge (not seen) can be accessed by the drive's mechanism. As the door 22 opens, the door hinge 28 rotates inwardly toward the right side 32 of the cartridge. Accordingly, the right side of the DLT cartridge 20 features a progressively deepening cavity 34 designed to accommodate the door hinge 28 when the door 22 is fully open. The shallower portion of the cavity 34 also features two ribs 36.

Thus, the right side 32 of the DLT cartridge contains several pronounced structural features that distinguish it from all other sides, as well as from every side of LTO, 3592, and 3590 cartridges. When a DLT cartridge is inserted in an I/O station by an operator, it must be placed top-side up and with the door 22 facing the exterior of the station; otherwise, the library picker cannot properly grab and retain the cartridge, and the picker may become disabled causing the automated library to go off-line and the stored data to become inaccessible. This possibility of failure is unacceptable in today's world of uninterrupted-service demand.

U.S. Pat. No. 6,141,180, issued to Smith, describes a pivoting lockout that prevents the incorrect placement of a cartridge into a receiving device, such as a tape magazine, a library or a mail slot. The lockout consists of a hinged member with a leading and a trailing edge protruding into the sleeve to be occupied by the cartridge when it is placed in the receiving device. Therefore, the cartridge can be successfully introduced into the device only one way, when the side containing the cavity is facing the hinged lockout member. Because of its configuration and placement, the lockout member is able to clear the ribs 36 and to fit into the cavity 34 of the cartridge (refer to FIG. 2 above) as the cartridge is pushed into the sleeve of the receiving device. Thus, the lockout of the invention prevents the complete insertion of the cartridge unless it is oriented correctly.

The Smith lockout device is not designed for a pass-through sleeve of the type present in I/O stations. It is only concerned with ensuring that the cartridge is placed correctly in a receiving cell from which it is to be extracted later in reverse direction. The present invention provides a new design for a lockout mechanism that may be used with pass-through sleeves and is therefore suitable for use in input/output stations.

Other methods of locking out improperly oriented cartridges sometimes involve the use of an external part of the I/O station to move a mechanism, e.g. a door or toggle bracket. It would be advantageous to have a fully self-contained mechanism for locking incorrect cartridges that does not require the use of parts that are external to the cell.

Other mechanisms to control cartridge orientation do not work well when various cartridges have a large disparity in size, such as between 3592 and LTO cartridges. These mechanisms attempt to locate a hole or void in the side of the cartridge. When a void locator falls into one of these holes, the cartridge is accepted into the cell. However, if a cartridge which is significantly smaller than the cartridge intended for the cell is inserted, the void locator will not prevent it from being inserted. Accordingly, it would be advantageous to have a device for locking out cartridges that are significantly smaller than the intended cartridge.

Yet another method of preventing the picker from grabbing an incorrect cartridge is to use an optical system to read labels placed on the cartridges. If the label cannot be found, is illegible, or does not include the expected information, the picker will refuse the cartridge. However, labels are prone to damage and falling off of cartridges. Additionally, an incorrect label may be placed on a non-compatible cartridge, incorrectly identifying it as an acceptable cartridge and allowing the picker to attempt to grip it. Therefore, it would be advantageous to provide a means for locking out non-compatible cartridges that does not rely on labels.

Each cartridge format has a set of physical characteristics that distinguishes it from other types of cartridges. Illustrated in FIG. 3, a 3592 cartridge 38 is defined by its size, its shape, and an angled recess 40 in the center of the lower portion of the front face 42 of the cartridge 44. While a mixed-media library, such as the IBM 3584, is designed to work with multiple cartridge formats, each slot 14 (FIG. 1) is usually adapted to accommodate only a single type of cartridge. Inserting the wrong type of cartridge into a slot may damage the picker, causing the library to go off-line. Additionally, data stored on the improperly inserted cartridge may be destroyed. Accordingly, it would be very desirable to have a mechanism that prevents the incorrect placement of a 3592 cartridge or the placement of another cartridge into the receiving slots of an I/O station designed to handle only 3592 cartridges.

SUMMARY OF THE INVENTION

The invention disclosed herein is a lockout mechanism that allows the complete introduction of a 3592 cartridge into an I/O station of a data cartridge library only when it is properly oriented. Additionally, the lockout mechanism prevents the insertion of cartridges that do not conform to the 3592 cartridge format. Non-compatible cartridges will not be accepted by the station and will prevent the closing of a door on the I/O station. Because an operator can immediately see that a cartridge has not been fully inserted, timely remedial action can be taken to prevent down-time and damage to the library. This lockout mechanism can be easily incorporated into the structure of existing I/O stations of automated libraries.

The invention consists of a hinged flap placed in the bottom of a cell and an associated spring. When no cartridge is inserted into the cell, the spring rotates the hinged flap above the floor of the cell. When a 3592 cartridge is properly inserted into the cell, the angled surface of the cartridge pushes the hinged flap down, disabling the lock-out function. If a 3592 cartridge is inserted with an incorrect orientation, the hinged flap will prevent it from being fully inserted. This will result in part of the cartridge remaining outside the cell and prevent an associated door from closing. Additionally, cartridges with formats that do not include an angled surface along their face cannot be fully inserted into the cell.

Various other purposes and advantages of the invention will become clear from its description in the specification that follows and from the novel features particularly pointed out in the appended claims. Therefore, this invention consists of the features hereinafter illustrated in the drawings, fully described in the detailed description of the preferred embodiment and particularly pointed out in the claims. However, such drawings and description disclose only some of the various ways in which the invention may be practiced.

DESCRIPTION OF THE PREFERRED EMBODIMENTS

This invention consists of a new lockout mechanism that prevents the closure of the I/O station of an automated library when the wrong cartridge or an incorrectly oriented 3592 cartridge is placed into a receiving slot. Accordingly, the invention can be used advantageously to provide an immediate realization that a cartridge has been placed incorrectly into the slot when an operator is manually inserting cartridges into the I/O station.

The terms front and rear are used throughout in connection with the structure of the 3592 cartridge described herein to refer to the side containing the door and to its opposite side, respectively. Left and right refer to the cartridge lateral sides as they appear viewing the cartridge from its front side. The term bottom and top are used with reference to the side of each cartridge that contains the tape reel and hub for connection with a corresponding driving spindle in a drive and to its parallel opposite side, respectively. The terms high and height are used with reference to the direction between the bottom and top sides of the cartridge. The terms deep and depth are used with reference to the direction between the lateral sides and the interior of the cartridge. Finally, the terms open and closed, as used in describing the operation of the toggle bracket of an I/O station and the levers of the invention, refer to conditions as seen from outside the I/O station. In particular, the open position of the levers corresponds to the state wherein the leading and trailing protrusions are removed from the corresponding slot in the station.

Figure 1:
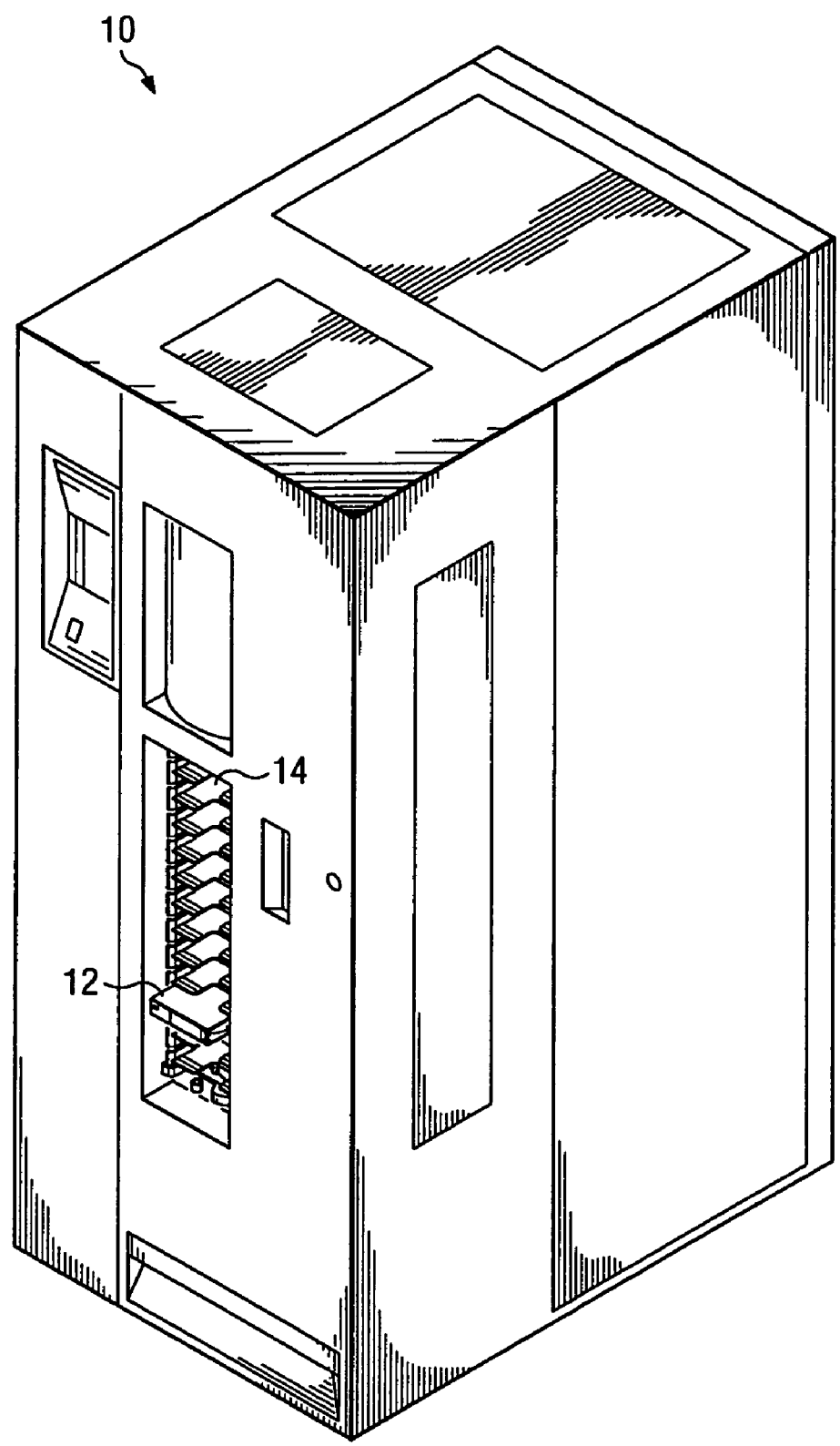
FIG. 1 is a perspective view of a conventional input/output station of an automated library for data cartridges.
Figure 2:
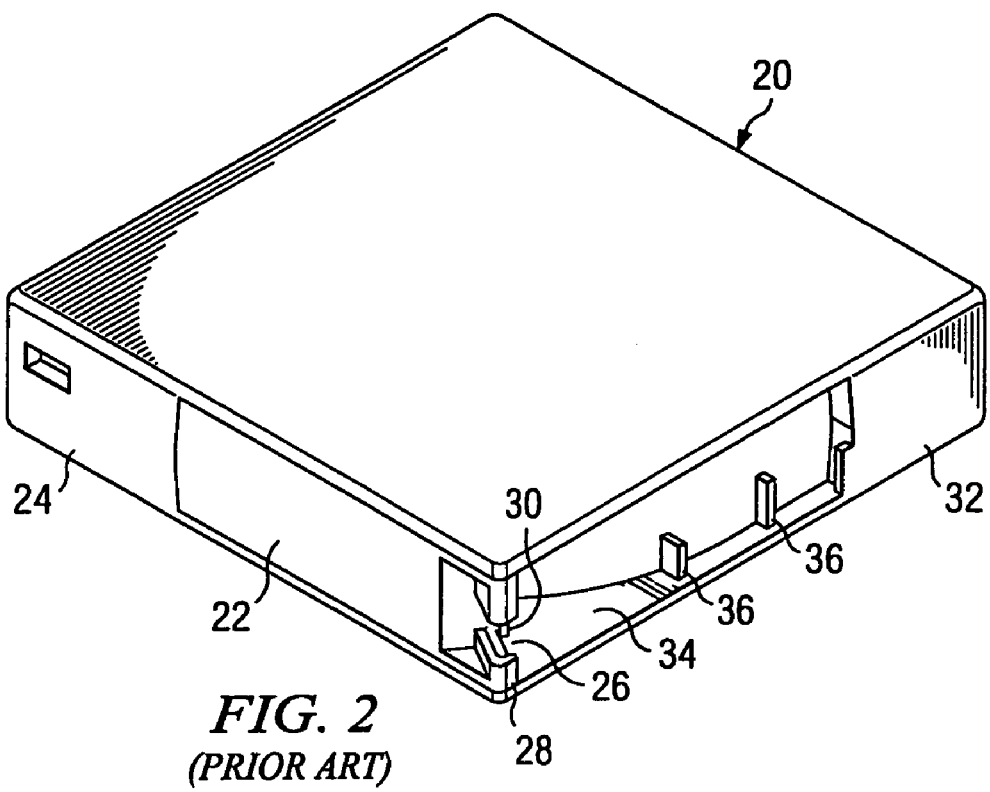
FIG. 2 is a perspective view of an exemplary data cartridge.
Figure 3:
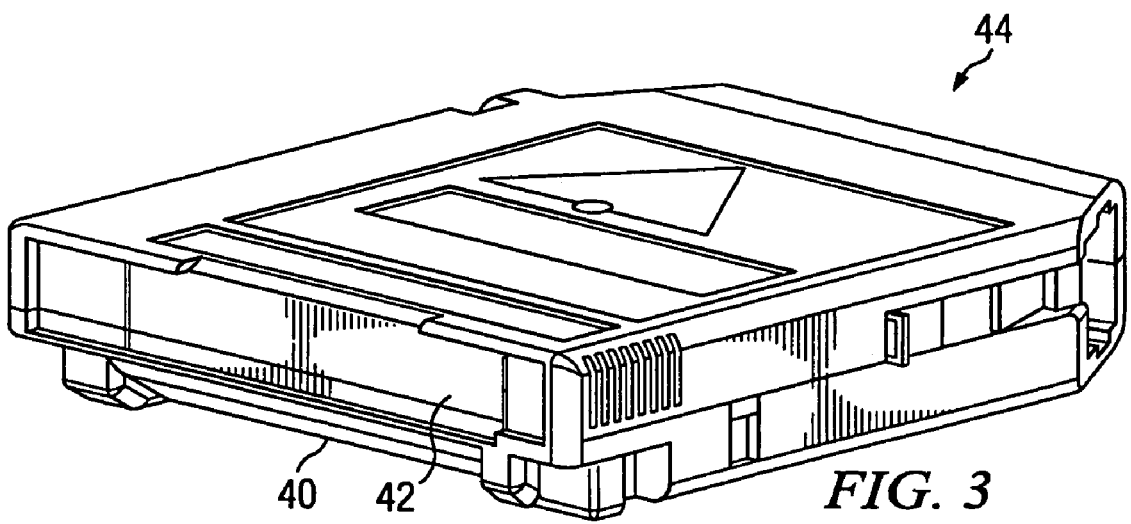
FIG. 3 is a perspective view of a 3592 data cartridge.
Figure 4:
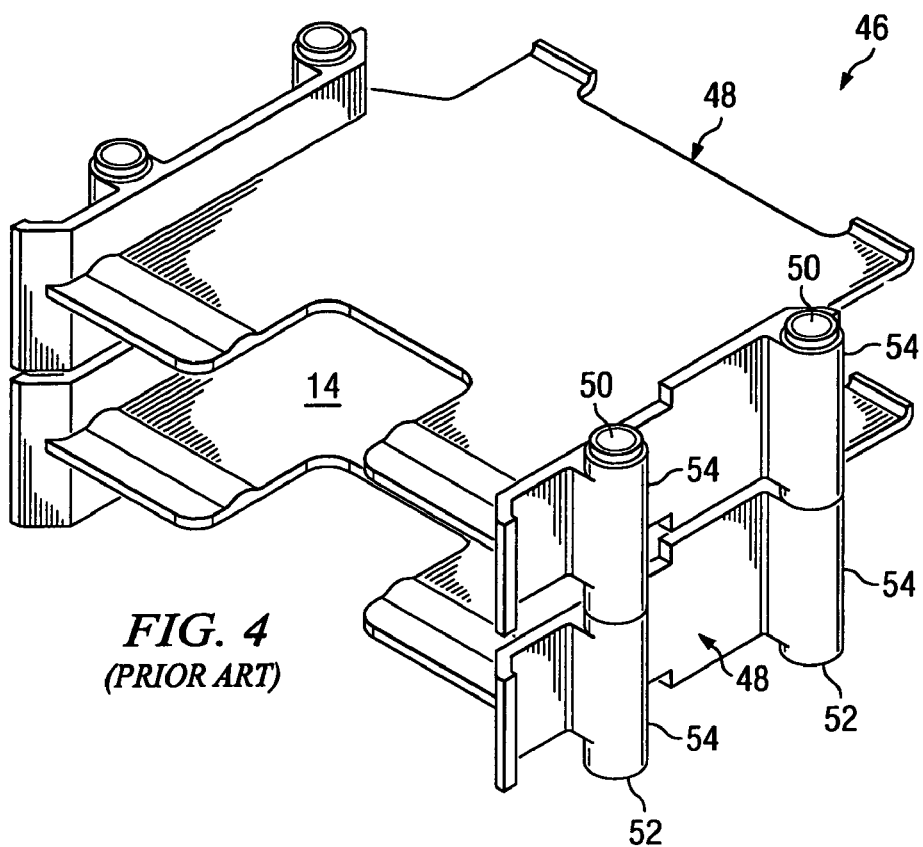
FIG. 4 is a perspective view of a cell of an IBM 3584 Library's I/O station that consists of two half-cell modules stacked together to define a pass-through receiving slot designed to accommodate a 3592 data cartridge.

Referring to the drawings, wherein like parts are designated throughout with like numerals and symbols, FIG. 4 illustrates the modular structure of each cell of the I/O station of a data cartridge library, which is used herein to illustrate the invention. Each cell 46 consists of a half-cell module 48 (see also FIG. 5) stacked over an identical component to define an individual slot 14 that conforms substantially to the shape and size of a 3592 cartridge with tolerances that allow the easy and convenient insertion of the cartridge through the slot without excessive lateral gaps. Mating ends 50,52 in the lateral post 54 on each side of the modules 48 make it possible to construct multiple-cell I/O stations simply by stacking the modules vertically.

Figure 5A:
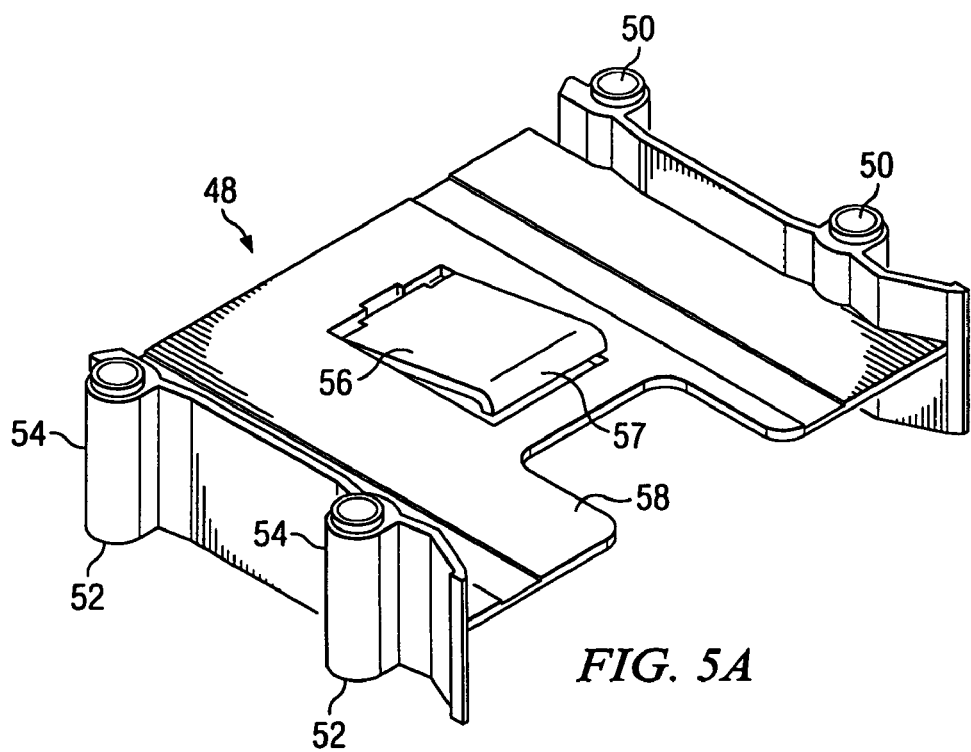
FIG. 5A is a perspective view of the top of a half-cell showing a hinged flap, according to the invention.
Figure 5B:
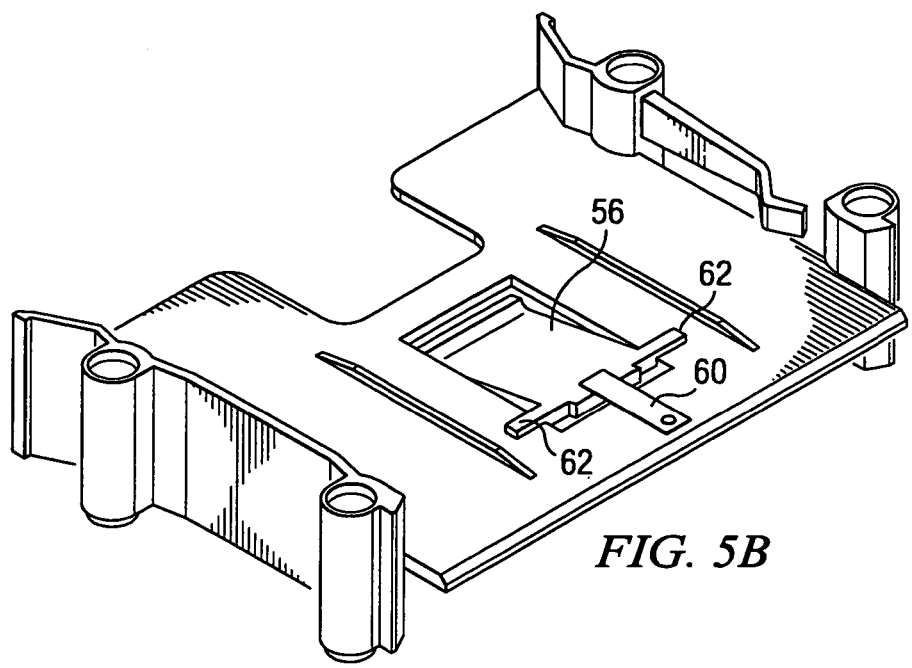
FIG. 5B is a perspective view of the bottom of the half-cell of FIG. 5A, illustrating a leaf spring and stops.

As shown in isolation in FIG. 5A, the lockout mechanism of the invention consists of a hinged flap 56 placed within the bottom surface 58 of a half-cell module 48. The hinged flap can be made of any material resilient or strong enough to resist the force of a cartridge being inserted into the cell, such as plastic or metal. The hinged flap 56 rotates about a post 63 (FIG. 5C,5d) or pair of pins (not shown). Viewed from below, as shown in FIG. 5B, a leaf spring 60 rotates the hinged flap 58 so that one end is elevated above the bottom surface 58. The hinged flap 56 is prevented from rotating below the bottom surface 58 by legs 62.

Figure 5C:
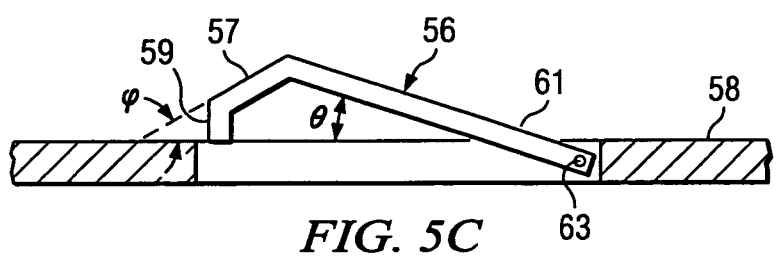
FIG. 5C is a side view of the hinged flap of FIG. 5A, illustrating a first flat surface located at the proximal end of the hinged flap that is orthogonal to the bottom of the half-cell, a ramp located at the distal end of the hinged flap forming a first angle θ with the bottom of the half-cell less than ninety degrees as measured from the distal end, and a second flat surface connecting the first flat surface and the ramp and forming a second angle φ with the bottom of the half-cell extending toward the proximal end less than ninety degrees.

FIG. 5C is a side view of the hinged flap of FIG. 5A, illustrating a first flat surface 59 located at the proximal end of the hinged flap that is orthogonal to the bottom surface 58 of the half-cell, a ramp 61 located at the distal end of the hinged flap forming a first angle $\theta$ with the bottom of the half-cell less than ninety degrees as measured from the distal end, and a second flat surface 57 angled so as to connect the first flat surface and the ramp and form a second angle $\phi$ with the bottom of the half-cell extending toward the proximal end of less than ninety degrees. For the purposes of this disclosure, the distal end of the hinged flap is the end closest to the post 63 and the proximal end of the hinged flap is the end furthest away from the post.

The angled surface 57 is intended to contact the angled surface 40 of the data cartridge 44. The angled surface 57 of the hinged flap may be any angle smaller than that formed by the angled surface 40 of the data cartridge. However, if the angled surface 57 of the hinged flap has an angle $\phi$ significantly greater than that of the angled surface 40 of the data cartridge, the data cartridge 40 may not be able to effectively force the hinged flap toward the bottom surface 58 of the cell.

Unless an angled surface 40 of a data cartridge 44 pushes against the angled surface 57 of the hinged flap 56, the orthogonal flat surface 59 of the hinged flap will push against any cartridge inserted into the cell 46. The ramp 61 allows cartridges 44 to be inserted into the cell 46 from the opposite direction by a picker robot.

Figure 5D:
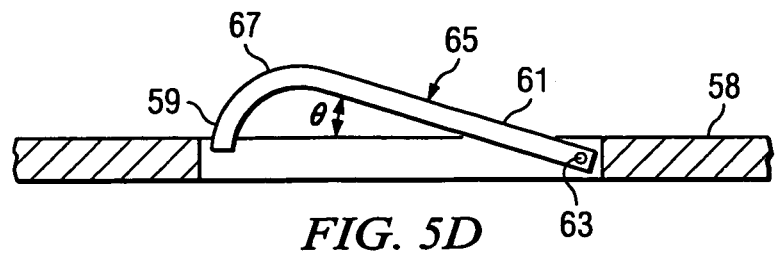
FIG. 5D is a side view of the hinged flap of FIG. 5A, illustrating a first flat surface located at the proximal end of the hinged flap that is orthogonal to the bottom of the half-cell, a ramp located at the distal end of the hinged flap forming an angle θ with the bottom of the half-cell less than ninety degrees as measured from the distal end, and a curved surface connecting the first flat surface and the ramp.

FIG. 5D is a side view of another embodiment of the hinged flap 56 similar to that illustrated in FIG. 5C. However, the angled flat surface 57 has been replaced by a curved surface 67. The function of this curved surface is the same as that of the angled flat surface 57 (above).

Figure 6A:
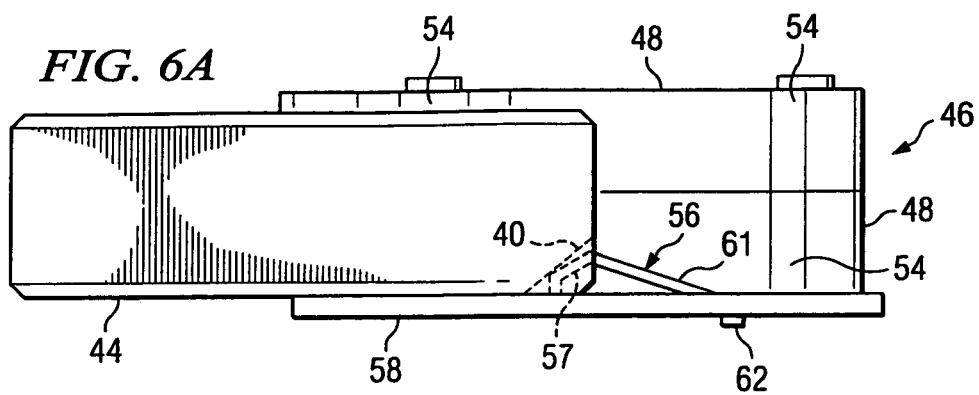
FIG. 6A is a cross-sectional side view of a cell formed from two half-cells, one of which includes the hinged flap of FIG. 5a, according to the invention.
Figure 6B:
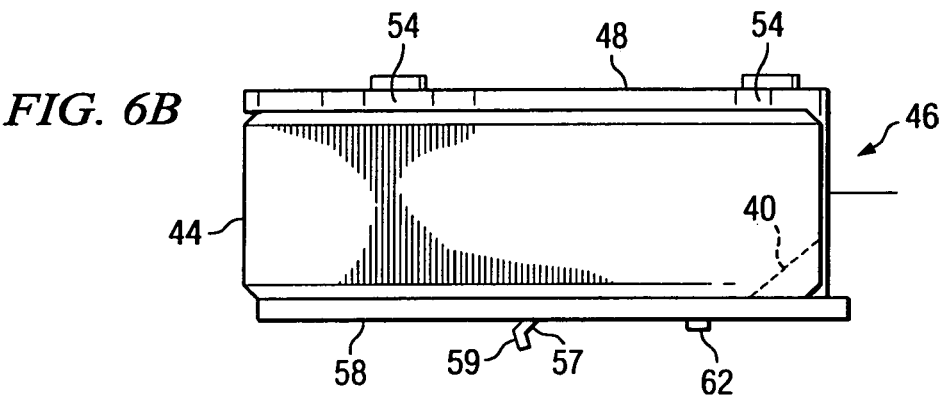
FIG. 6B is a cross-sectional side view of the cell of FIG. 6A with a 3592 data cartridge fully inserted.

This invention makes use of a unique characteristic of the 3592 data cartridge 44, i.e., the angled surface 40 in the front 42 of the cartridge. When no cartridge is placed within a cell 46, the hinged flap 56 is rotated above the bottom surface 58. When a 3592 data cartridge 44 is properly inserted into the I/O station by an operator, the angled surface 40 contacts the angled edge 57 of the hinged flap 56. The contact angle creates a force that pushes the hinged flap away from the cavity of the cell 46. As illustrated by FIGS. 6A,6B, when a 3592 cartridge is correctly inserted into the cell 46, the angled surface pushes the hinged flap 56 down until the top surface of the hinged flap 56 is flush with the top of the bottom surface 58 of the half-cell module 48. This allows the cartridge to be fully inserted into the cell.

Once the data cartridge 44 has been fully inserted into the cell 46, an external door on the I/O station closes and a picker can grab and move the cartridge. The hinged flap 56 does not impede the removal of the cartridge 44 because the weight of the cartridge keeps the hinged flap 56 in its recessed position. If the cell 46 is oriented so that the bottom surface 58 of the half-cell module 48 is not horizontal and below the data cartridge 44, the two half-cell modules 58 must create a cell 46 that is large enough to accept the cartridge but small enough to exert pressure on the top of the cartridge and, in turn, force the hinged flap into its recessed position.

Figure 7A:
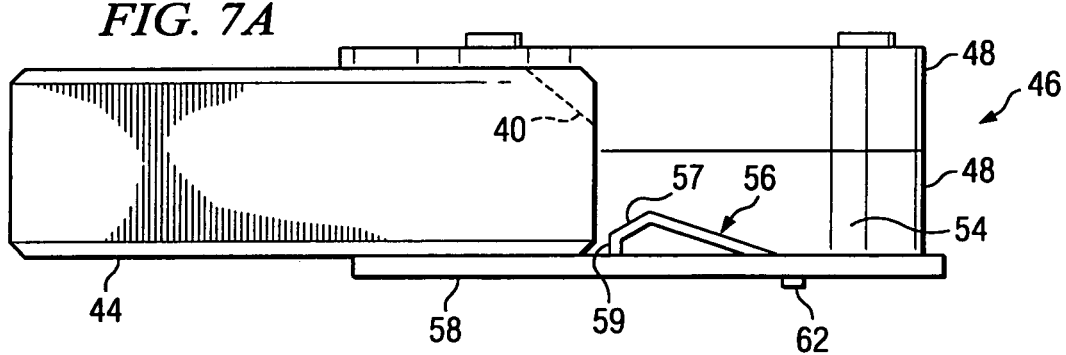
FIG. 7A is a cross-sectional side view of the cell of FIG. 6A with a 3592 data cartridge improperly inserted into the cell.
Figure 7B:
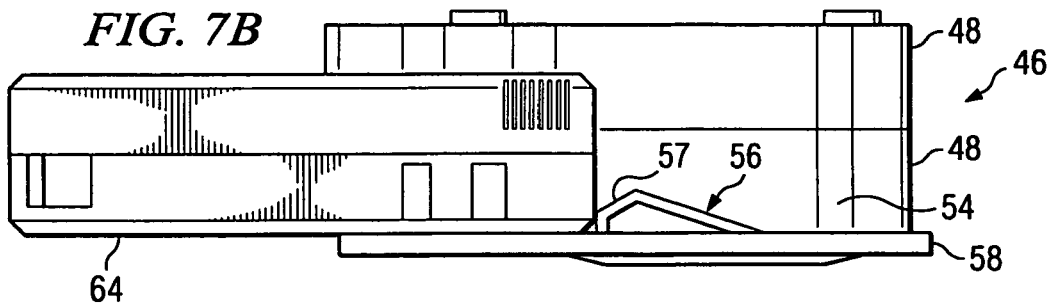
FIG. 7B is a cross-sectional side view of the cell of FIG. 6A with an LTO data cartridge improperly inserted into the cell.

If a 3592 cartridge 44 is improperly placed into the cell 46, the hinged flap 56 prevents the cartridge from being fully inserted, as illustrated in FIG. 7A. Without an angled recess to push against the angled surface 57 of the hinged flap 56, the edge of the cartridge pushes against the flat surface 59 of the hinged flap. Likewise, other types of cartridges will be prevented from fully entering the cell. FIG. 7B illustrates an incorrect insertion of an LTO cartridge 64, prevented from entering the cell 46 by the flat surface 59 hinged flap 56.

Thus, a new design for a lockout mechanism is provided that is suitable for implementation within a conventional I/O station of an automated library. The device of the invention prevents the closure of the I/O station's door when any cartridge is introduced other than a 3592 cartridge that is oriented correctly. Furthermore, when the 3592 cartridge is inserted correctly, the device allows its unimpeded passage through the I/O slot for automated handling by library robots. Yet another advantage is the totally mechanical implementation of the invention, with no need for electrical components or computerized control for carrying out its function.

Various changes in the details, steps and components that have been described may be made by those skilled in the art within the principles and scope of the invention herein illustrated and defined in the appended claims. For example, the spring 60, posts, and legs 62 may be implemented with other types of tension devices and stops. Therefore, while the invention has been shown and described in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

The terms and expressions which have been employed in the foregoing specification are used herein as terms of description and not of limitation, and there is no intention in the use of such terms and expressions of excluding equivalents of the features shown and described or portions thereof, it being recognized that the scope of the invention is defined and limited only by the claims which follow.

We claim:

1. A mechanism for preventing incorrect loading of a data cartridge into a cell in an input/output station, the cartridge having a front face with a recessed angled surface, and the cell having a bottom surface facing a cavity adapted to receive the cartridge, comprising:

a hinged flap placed within the bottom surface of the cell and mounted to the bottom surface at a rotatable first end, and a second end incorporating a first flat surface substantially orthogonal to the bottom surface, the hinged flap including a ramp surface, and a second, angled flat surface between the first flat surface and the ramp surface, wherein:

the second, angled flat surface forms an angle φ with the bottom surface as measured at a vertex formed by the second flat surface and the bottom surface, the angle φ corresponding to an angle of the recessed angled surface of the cartridge to force the hinged flap toward the bottom surface of the cell.

2. The mechanism of claim 1, wherein the angle φ includes any angle smaller than the angle of the recessed angled surface of the cartridge.

3. The mechanism of claim 1, further including a leg structure integrated into the rotatable first end of the hinged flap to prevent the hinged flap from rotating below the bottom surface of the cell.

4. The mechanism of claim 1, further including a leaf spring in mechanical communication with the rotatable first end of the hinged flap to rotate the hinged flap.

5. The mechanism of claim 1, wherein the first flat surface or second, angled flat surface of the hinged flap is engaged by any surface of the cartridge as the cartridge is inserted into the cell.

6. The mechanism of claim 1, wherein the rotatable first end rotates about a post structure or pair of pins.

7. The mechanism of claim 1, wherein the ramp surface allows the cartridge to be inserted into the cell from an opposite direction by a picker robot.

8. A system for manipulating data cartridges including a mechanism for preventing incorrect loading of a data cartridge into a cell in an input/output station, said cartridge having a front face with a recessed angled surface and said cell having a bottom surface facing a cavity adapted to receive the cartridge, comprising:

a hinged flap placed within the bottom surface of the cell and mounted to the bottom surface at a pivotable first end, and a second end incorporating a first flat surface substantially orthogonal to the bottom surface, the hinged flap including a ramp surface, and a second, curved surface between the first flat surface and the ramp surface, wherein:

the second, curved surface forms an angle φ with the bottom surface as measured at a vertex formed by the second flat surface and the bottom surface, the angle φ corresponding to an angle of the recessed angled surface of the cartridge to force the hinged flap toward the bottom surface of the cell; and a leaf spring in mechanical communication with the pivotable first end of the hinged flap to rotate the hinged flap.

9. The mechanism of claim 8, wherein the angle φ includes any angle smaller than the angle of the recessed angled surface of the cartridge.

10. The mechanism of claim 8, further including a leg structure integrated into the pivotable first end of the hinged flap to prevent the hinged flap from rotating below the bottom surface of the cell.

11. The mechanism of claim 8, wherein the first flat surface or second, angled flat surface of the hinged flap is engaged by any surface of the cartridge as the cartridge is inserted into the cell.

12. The mechanism of claim 8, wherein the pivotable first end rotates about a post structure or pair of pins.

13. The mechanism of claim 8, wherein the ramp surface allows the cartridge to be inserted into the cell from an opposite direction by a picker robot.

14. A method of manufacturing a mechanism for preventing incorrect loading of a data cartridge into a cell in an input/output station, the cartridge having a front face with a recessed angled surface, and the cell having a bottom surface facing a cavity adapted to receive the cartridge, comprising:

providing a hinged flap placed within the bottom surface of the cell and mounted to the bottom surface at a rotatable first end, and a second end incorporating a first flat surface substantially orthogonal to the bottom surface, the hinged flap including a ramp surface, and a second, angled flat surface between the first flat surface and the ramp surface, wherein:

the second, angled flat surface forms an angle φ with the bottom surface as measured at a vertex formed by the second flat surface and the bottom surface, the angle φ corresponding to an angle of the recessed angled surface of the cartridge to force the hinged flap toward the bottom surface of the cell.

15. The method of manufacture of claim 14, wherein the angle φ includes any angle smaller than the angle of the recessed angled surface of the cartridge.

16. The method of manufacture of claim 14, further including providing a leg structure integrated into the rotatable first end of the hinged flap to prevent the hinged flap from rotating below the bottom surface of the cell.

17. The method of manufacture of claim 14, further including providing a leaf spring in mechanical communication with the rotatable first end of the hinged flap to rotate the hinged flap.

18. The method of manufacture of claim 14, wherein the first flat surface or second, angled flat surface of the hinged flap is engaged by any surface of the cartridge as the cartridge is inserted into the cell.

19. The method of manufacture of claim 14, wherein the rotatable first end rotates about a post structure or pair of pins.

20. The method of manufacture of claim 14, wherein the ramp surface allows the cartridge to be inserted into the cell from an opposite direction by a picker robot.

* * * * *